United States Defensive Publication [19] (H) [11] T984,003

Sifferman et al. [43] Jul. 3, 1979

[54] RECOVERY OF HIGH VISCOSITY NATIVE CRUDE SAMPLES

[75] Inventors: Thomas R. Sifferman; Michael W. Britton, both of Ponca City, Okla.

[73] Assignee: Continental Oil Company, Ponca City, Okla.

[21] Appl. No.: 945,675

[22] Filed: Sep. 25, 1978

[51] Int. Cl.[2] ..... E21B 47/00

[52] U.S. Cl. ..... 166/264

[57] ABSTRACT

Native bottomhole samples of very viscous crude oil (bitumen, tar) are obtained by injecting water plus a suitable surfactant mixture down a hollow sucker rod whereby mixing occurs downhole, producing a resultant oil-in-water emulsion, and recovering the crude oil from the emulsion. Contamination of the crude oil sample with light hydrocarbons is avoided.

1 Claim, No Sheets Drawing,

4 Pages Specification

The file of this unexamined application may be inspected and copies thereof may be purchased (849 O.G. 1221, Apr. 9, 1968).